Aug. 20, 1935.   S. T. SMITH   2,012,251
FISHING REEL SPOOL CONTROL
Filed Feb. 19, 1934   2 Sheets-Sheet 1

INVENTOR.
Skardon T. Smith
BY Myron J. Dikeman
ATTORNEY.

Aug. 20, 1935.   S. T. SMITH   2,012,251

FISHING REEL SPOOL CONTROL

Filed Feb. 19, 1934   2 Sheets-Sheet 2

INVENTOR.
Skardon T. Smith
BY
Myron J Dikeman
ATTORNEY.

Patented Aug. 20, 1935

2,012,251

UNITED STATES PATENT OFFICE 2,012,251

FISHING REEL SPOOL CONTROL

Skardon T. Smith, Detroit, Mich.

Application February 19, 1934, Serial No. 711,875

6 Claims. (Cl. 242—84.5)

My invention relates to a control means adapted for fishing reel spools, and is an improvement of the reel unit described in my former patent application Serial No. 688,140, filed Sept. 5, 1933, and when applied therewith, forms a complete operating unit for a reel spool, the former device converting said spool into a free wheeling unit independent of the winding crank, and will allow free spinning of the spool when the fishing line is cast in the ordinary manner. However, this unit with an uncontrolled spool may result in an over-spinning thereof, producing a back lash, or snarling, of the line due to the spool spinning exceeding the line unwinding. My new device herein described is a control means for regulating the spool spinning to a limited extent, although not effecting the operation of any of the reel winding mechanism, the result is to prevent over-spinning of the spool for any ordinary line casting.

The object of my invention is to provide a spool control means for any kind of line winding reel, designed to prevent line snarls which often result when the reel spool is rotated at a speed greater than the line unwinding.

Another object is to produce a reel spool control especially adapted for fishing reels for preventing an over-spinning of the spool when the line is cast.

A further object is to produce a reel spool control means, by retarding members reacting against some of the reel rotating units operating directly with the spool for unwinding, and automatically release these rotating units when rotated in the reverse direction.

A still further object is to produce a spool control that may be applied to any type of fishing reel without alteration or replacement of any of its operating parts, and without affecting its general operation.

Another object is to produce a spool control means that will prevent over-spinning of the reel spool without applying manual means thereto, as by pressure of the thumb as is now the common practice.

Yet another object is to produce an automatic reel spool control that is simple in construction, easily and efficiently operated and that can be manufactured at a very low cost.

The several objects are attained in the preferred form by the construction and arrangement of parts more fully hereinafter set forth.

Similar parts on all drawings are marked by similar numerals or letters.

Figure 9:
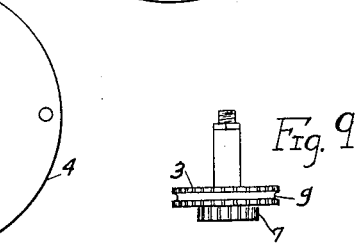

The Fig. 9 is an elevation illustrating a typical drive, or bull-gear as is used in the ordinary fishing reel, and is provided with a special retarding spring groove.

Figure 10:
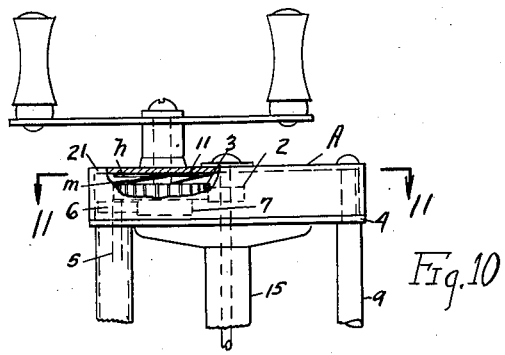

Fig. 10 is a partial elevation of a fishing reel, with the head casing partially cut away, showing the operating gears and a modified type of resilient retarding surface washer as applied to the top side of the gear.

Figure 11:
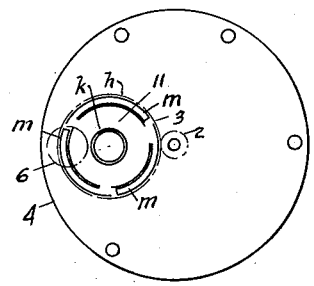

Fig. 11 is a cross-sectional view taken on the line 11—11 of the Fig. 10, showing a plan view of the resilient surface washer as mounted above the gear and its relative position thereto.

Figure 12:
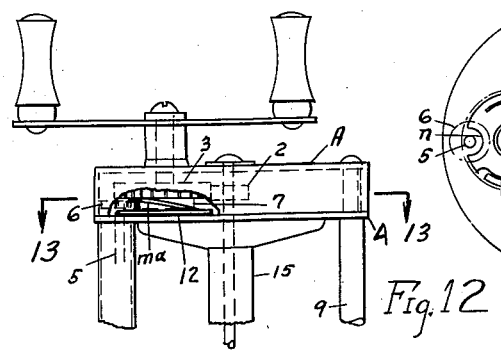

Fig. 12 is also a partial elevation of a fishing reel, with the reel head casing partially cut away, showing the operating reel mechanism and a modified form of resilient surface washer as applied to the bottom side of the drive gear.

Figure 13:
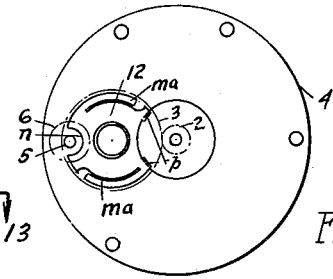

Fig. 13 is a cross sectional view taken on the line 13—13 of the Fig. 12 showing a plan view of the bottom resilient surface washer and its relative position on the gear.

Figure 14:
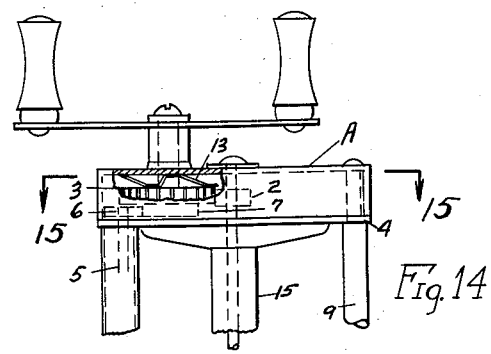

Fig. 14 is another partial elevation of a reel, with the head casing partially cut away showing the installation of a further modified resilient retarding surface washer as applied to the top of a solid type or reel drive gear illustrated in the Fig. 9.

Figure 15:
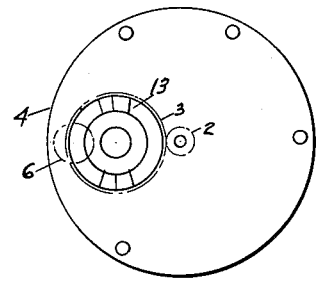

Fig. 15 is a cross-sectional view taken on the line 15—15 of Fig. 14 showing the surface washer formation and its relative position on the drive gear.

Figure 16:
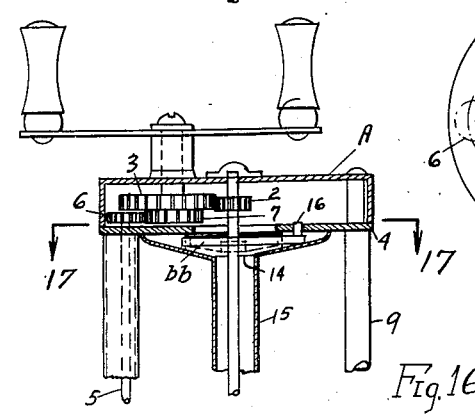

Fig. 16 is a partial vertical sectional view taken lengthwise of a fishing reel head showing a retarding drum as mounted within the spool section.

Figure 17:
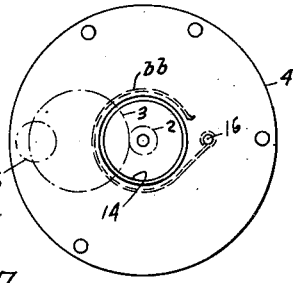

Fig. 17 is a cross-sectional view taken on the line 17—17 of the Fig. 16, showing the relative position of the spool retarding drum and the resilient spring retarding means as applied thereto.

To effect the desired result in my invention, a retarding force or drag must be applied either to the reel spool direct, or by applying it to some rotating unit connected directly thereto, and that will continue to turn during the spool spin, while casting. In my former invention heretofore referred to by serial number, the winding unit is automatically disconnected from the spinning spool during the line cast, re-engaging therewith when rotation is applied to the winding crank, forming a free wheeling spool unit for casting. Other types of reels retain a fixed gear connection and operation for both directions of spool rotation. The free wheeling type, if the spool is allowed to run unrestrained, may over-spin, and cause snarling of the line in casting. This may also be true of other types of reels. My retarding means may be applied as of the band and drum type, or as a resilient surface washer formation, or both.

I have more specifically illustrated my invention herein, by illustration of the band and drum type of resilient retarding means, and with modifications for the surface washer type, and as applied to both the operating gear units or the free spool direct. It may be applied equally as well to any other rotatable unit connected to the reel spool, that retains such connection during the spool spinning while casting.

I will now describe more fully the detailed construction of my device, referring to the drawings and the marks thereon.

Figure 2:
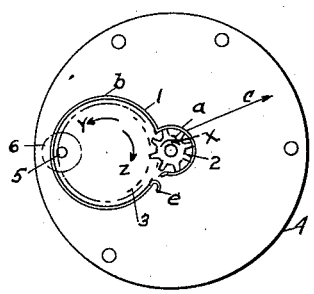
Fig. 2 is a cross-sectional view through the fishing reel head taken on the line 2—2 of the Fig. 1 showing one form of double cylinder resilient retarding unit designed to fit and operate with both drive and spool pinion gear.
Figure 3:
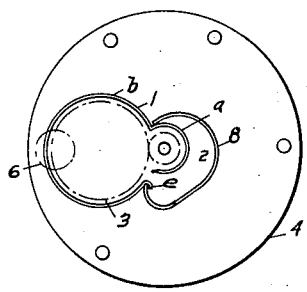
Fig. 3 is a cross sectional view taken on the same line 2—2 of Fig. 1 showing an added tension spring mounted on the retarding unit illustrated in Fig. 2.
Figure 4:
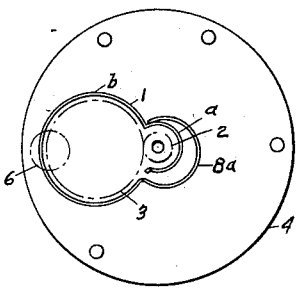
Fig. 4 is a further illustration of the same resilient retarding unit, but with the spring yoke formed as an integral part thereof.
Figure 1:
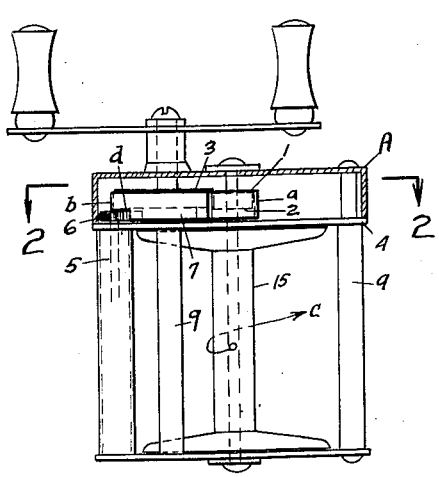
Fig. 1 is an elevation of a typical fishing reel, showing its rotatably operating units for driving the reel spool, and one form of control means as applied thereto, the drag means being applied to the gear rims.

The double drum, or cylindrical type of spool retarding unit 1, as illustrated in the Figs. 1, 2 and 3 of the drawings, is made of a thin, light bar of some suitable resilient material, preferably of a light spring metal bar, although any other suitable resilient material may also be used if desired. The double retarding unit 1 is designed and curved into a continuous, double, semi-circular shape, forming connected drum sectons a and b, and with their respective centers coinciding with the axis of the spool pinion gear and the connected drive gears 2 and 3 as are mounted on the reel head plate 4 of the fishing reel A. The drum sections a and b are formed with internal diameters slightly less than the outside tooth diameters of the gears 2 and 3. The double retarding unit 1, when the drum sections are slightly enlarged, is fitted over the respective gears 2 and 3, counter-clockwise for the gear 3, and the drum sections allowed to engage directly with the teeth ends of their respective gears, and as illustrated in the Figs. 1, 2, and 3 of the drawings. The slight tension of the resilient unit 1, causes a slight drag, or braking effect on the gears 2 and 3 of the reel A when an attached fishing line c is cast outward, causing the gears 2 and 3 to have spinning rotations in the directions indicated by the arrows x and y, the slight spring wall friction of the casing drum sections a and b on said gears rotating in opposite directions, tends to close their outer ends about the respective gears, automatically increasing their drag, or braking force thereon, and further retard the spinning spool of the reel. The faster the spool 15 spins, the greater is the drag of the unit 1. However when the direction of rotation of the gears 2 and 3 is reversed, as to the winding directional rotations as indicated by the arrow z of gear 3, the retarding unit 1, due to its slight friction contact on the gear teeth, tends to open slightly and thereby release the rotating gears for the winding directions.

Some types of reels A are provided with automatic line winding, or leveling mechanism, herein illustrated by the shaft 5 which carries a pinion gear 6 mounted thereon. The gear 6 meshes with a sub-drive gear 7 attached to the bottom of the spool drive gear 3. When this type of reel is used, the retarding unit casing 1 must be recessed in the bottom edge as indicated by the wall notch d, for the drum section b, as shown in the Fig. 1. This gear recess or wall notch d applies to all of the various retarding units illustrated in the Figs. 1 to 7.

When the resilient retarding unit 1 is applied to a large reel unit, or a less resilient body section is desired for the drum sections a and b, a spring tension yoke 8, of the required size, shape and strength, may be attached to the casing spring hook end e of the drum section b, and hooked over the drum section a, as indicated in the Fig. 3 of the drawings. A similar arrangement and effect may be secured by extending the spring end of the drum section b, to form a spring yoke 8a directly thereon, positioned to engage the drum section a as indicated in the Fig. 4, and functions the same as in the former case, although the strength of this type of spring yoke cannot be varied from that of the retarding unit walls, as is the case in the separate yoke 8 used in the Fig. 3.

Figure 5:
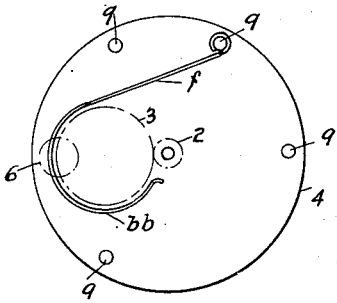
Fig. 5 is a cross-section through the reel head taken on the same line 2—2 showing the reel operating gears, and illustrating a modified form of resilient gear retarding unit mounted on one of the reel posts.

A modified form of retarding unit is illustrated in Fig. 5 of the drawings, using a single drum retarding unit, the single drum section bb being the same in its structure as the similarly positioned drum b of the Fig. 2, but with the inner end f extended to one side of the reel head casing and mounted on the end of one separator rod 9. Its operation and reaction of the drive gear 3 is exactly the same as in the former case, although not adapted to adjustment on the inclosed gears as are the previously described designs.

Figure 6:
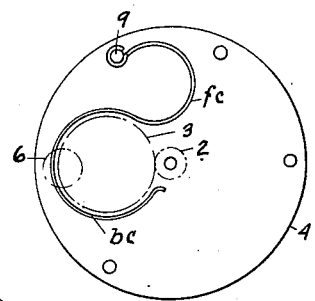
Fig. 6 shows the same cross-section on line 2—2 of the Fig. 1, illustrating a modified form of post resilient unit, producing a double spring action.

The Fig. 6 shows a further modification of the single drum type shown in Fig. 5, and is formed with a double reverse drum section bc extended into a curved support arm fc. This type is more sensitive to the drag rotations of the inclosed gear than the straight connecting arm of the former design. Otherwise, its structure and operation is the same as in the previous design.

Figures 7, 8:
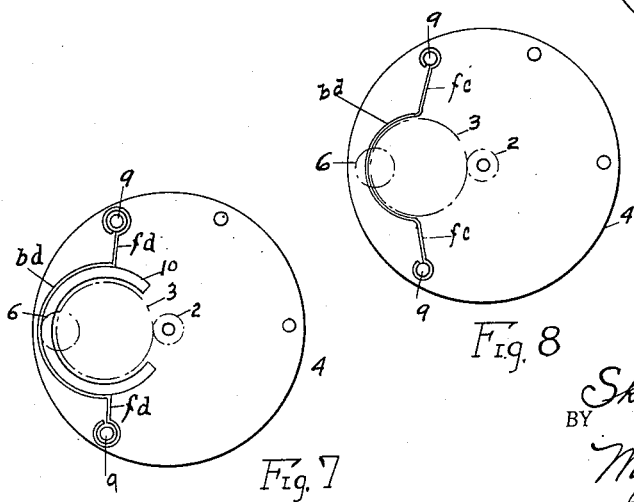
Fig. 7 is the same cross-section through the reel head showing a form of resilient retarding unit fixedly mounted on both ends and engaging the gear teeth ends at the center thereof.
Fig. 8 is also the same cross section through the reel head taken on the same line 2—2 of Fig. 1, showing a similar retarding unit as that illustrated in the Fig. 7, except it is made of round spring wire instead of a flat spring material, and engages the edge groove of the drive gear as illustrated in Fig. 9.

A further modification of a single resilient retarding unit is shown in the Fig. 7, utilizing only a semi-circular drum section bd, and with both end arms *fd* extended sidewise and formed with loop ends, both for engaging reel separator post ends 9. A drum shoe 10 may be mounted inside of the unit spring wall for more efficiently engaging the gear teeth ends by a greater friction, or the shoe may be omitted if desired. If heavy material is used in the frame or shoe, and with loose arm end loops, sufficient drag may be caused on the gear 3, by gravity, without the spring effect of the unit arms. A similar drum shoe may also be added in like manner to any of the previously described units, and for the same purpose and effect. The remaining structure and operation of the drum section *bd* is the same as in the former case, except it applies the same drag in both directions of gear rotation. This same type may also be made of spring wire, shown in Fig. 8 having the same general design and application in mounting, except as applied to the drive gear 3 through an edge groove *g* formed therein as indicated in the Fig. 9. The operation and result is the same as the flat spring member shown in Fig. 7.

The modified type of resilient surface washer retarding units is illustrated in the Figs. 11, 13 and 15. The surface washer 11 is made of thin, flat spring material, formed with concentric circular inner and outer edges *h* and *k*, and is provided with raised circular arc spring fingers *m* formed in the outer edge wall. The surface retarding washer is applied to the top of the drive gear 3 as indicated in the Fig. 10 of the drawings, and with the fingers *m* engaging the upper face of the gear 3 and contacted therewith by pressure against the outside washer face engaging the reel head casing 21. This type of resilient retarding washer is especially designed for the free wheeling type of fishing reel using my automatic locking unit in the drive gear as more specifically described in my former patent application heretofore referred to by serial number, although this type of surface washer may be used with the solid type of reel spool drive gear if desired, said washer being installed with the spring fingers *m* positioned clockwise as indicated in Fig. 11, as in this position it will react to retard the spinning unwinding spool 15 as in the former cases, also slightly release in friction on the engaging gear 3 on the reverse rotation thereof.

The resilient retarding surface washer 12 is of similar formation as the washer 11 just described, except the fingers *ma* are cut and raised in the opposite direction to those of washer 11, said washer 12 being mounted in an inverted position within the reel head, and with its flat surface resting on the reel head plate 4 and with the projected fingers *ma* engaging the under surface of the drive gear 3 as indicated in the Fig. 12. The outer edge of the surface washer 12 is formed with a gear recess *n* for the winding pinion 6, also with edge clamp arms *p* on the opposite edge thereof for engaging and attaching the washer fixedly to the reel head plate 4. Its reaction and operation is the same as that for the washer 11 previously described.

An alternate form of surface retarding washer is shown in washer 13, in Figs. 14 and 15, comprising a plane washer formation, made of like spring material, having concentric inner and outer circular edges as in the former case, said washer 13 being curved laterally, in alternate long and short step formation as indicated in the Fig. 14 and is applied to the top surface of the drive gear 3 as indicated. The washer 13 may also be applied to the bottom side of the drive gear 3 in the same manner as illustrated in the previous Fig. 12, if desired. This type of resilient retarding unit is not as effective as the washers 11 and 12 as the drag on the engaged drive gear is the same in both directional rotations.

An alternate form of application of the band and drum type of retarding unit *bb* or *bc* as shown in the Figs. 5 and 6 of the drawings, is illustrated in the Figs. 16 and 17, a special drum member 14 is fixedly mounted in the open spool end 15, concentric with the spool axis of rotation, and a stud 16 is fixedly mounted in the reel head plate 4 and projected into the spool end opening. Either the resilient retarding unit *bb* or *bc*, but herein illustrated as *bb*, may be mounted over the drum 14 with the loop end of the spring attached to the post stud 16, in a similar manner as shown in the Figs. 5 and 6, except the spring retarding unit *bb* is oppositely positioned thereon and with the drum section *bb* clockwise. Its operation and function is exactly the same as in the previously described cases, as it is not material whether applied to the drive gear connected to the spool or connected to the spool directly.

Having fully described my fishing reel spool control, what I claim as my invention and desire to secure by Letters Patent is:

1. A control unit adapted to fishing reels to prevent over-spinning of the reel spool when casting a line therefrom and used therewith, comprising a resilient retarding unit formed of a thin, narrow strip of spring material shaped circularly to partially inclose circumferentially a rotatable surface of a reel spool member, said resilient retarding unit being so mounted as to apply by friction contact with the surface of the reel spool rotating member operatively as a brake in the direction of the unwinding rotations only, and end attaching means formed thereon to engage some reel member and prevent rotation of the retarding unit.

2. A control unit adapted for fishing reels to prevent over-spinning of the reel spool when line casting therefrom and used in combination with the reel operating mechanism, comprising a retarding unit casing formed in a double curved spring member with free ends, designed to partially inclose and engage by friction contact two opposing rotatable surfaces of the reel spool operating mechanism, in the direction of the line unwinding rotations turning toward the unit casing free ends.

3. A spool control unit adapted to fishing reels for preventing over-spinning of the reel spool when line casting therefrom and used in combination with the spool winding mechanism, comprising a resilient retarding unit casing formed of a double curved spring member having hooked ends, designed to partially inclose and engage by friction contact two adjoining and opposing rotatable surfaces of the reel spool operating mechanism in the direction of the line unwinding rotations turning toward the unit casing free ends, and a spring tension yoke mounted thereon for engaging one casing hook end causing a stress therein.

4. A control unit adapted to fishing reels for preventing over-spinning of the reel spool and used in combination therewith, comprising a resilient retarding casing unit of spring material formed of a double curved spring member with free ends, designed to inclose and engage by friction contact two adjoining and opposing rotatable surfaces of the reel spool operating mechanism in the direction of the line unwinding rotations toward the casing free ends, one of the unit casing free ends being extended to form a spring yoke designed to engage one of the curved walls of the unit casing and cause an added stress therein.

5. A control unit adapted to fishing reels for controlling the unwinding rotations of the reel spool and used in combination with the spool operating mechanism, comprising a retarding unit casing formed of a curved spring member having one loop end for fixedly mounting same on a suitable fixed support and designed to partially circumferentially inclose and engage by friction contact one rotatable reel spool member operative as a brake in the direction of the unwinding rotation toward the unit casing free end, and means for fixedly connecting the casing loop end to a fixed reel member.

6. A control unit adapted to fishing reels for preventing over-spinning of the spool in its unwinding direction and used in combination therewith, comprising a resilient retarding unit formed of a curved spring member having loop ends for fixedly mounting same on suitable fixed casing supports and designed to partially circumferentially inclose and engage by friction contact one rotatable reel spool member.

SKARDON T. SMITH.